March 26, 1963 J. JOHNSON 3,082,459
RESIN ROLLER
Filed Nov. 3, 1961
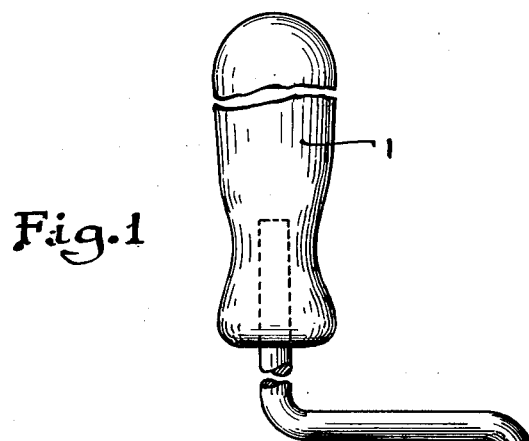
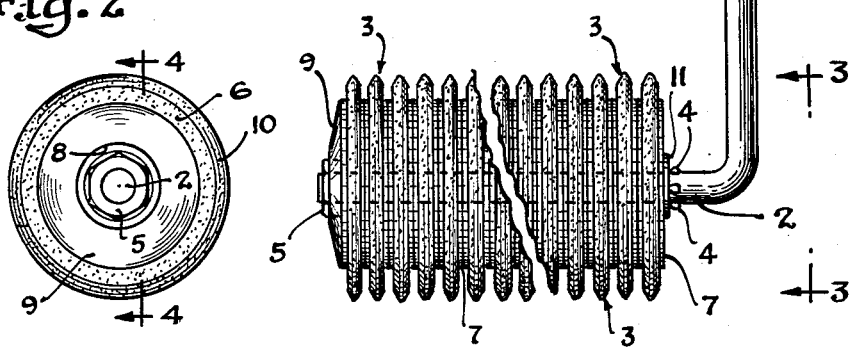
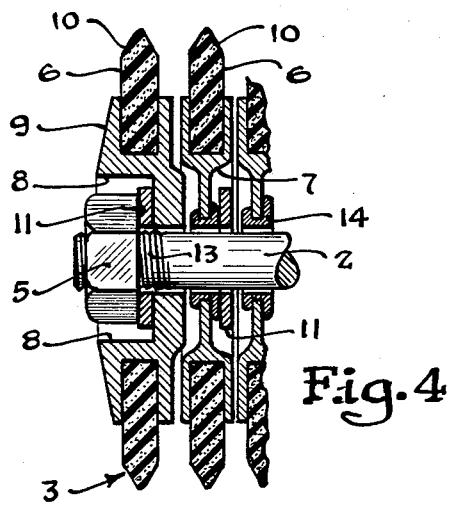
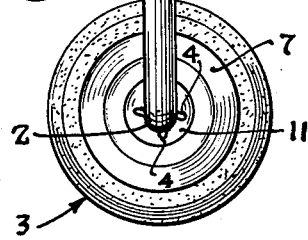
Inventor
Jay Johnson
By Herbert B. Keil
Attorney

United States Patent Office 3,082,459
Patented Mar. 26, 1963

3,082,459
RESIN ROLLER
Jay Johnson, 5350 Jessen Drive, La Canada, Calif.
Filed Nov. 3, 1961, Ser. No. 149,918
4 Claims. (Cl. 15—230)

The present invention relates to a device for rolling out reinforced plastics. More particularly, the subject invention is directed to an improved roller for distributing plastics throughout fibrous reinforcing materials and for working air bubbles out of such compositions.

The use of reinforced plastics as protective coatings and building materials has increased enormously in recent years. Products such as boat hulls and decks, furniture, fishing rods, automobile bodies, etc., have been made of fiberglass and, to a lesser extent, asbestos reinforced plastics. In another field, impregnated fiberglass blankets have been used with success as coverings for airplane wings and bodies. The plastic substance that is mixed with or applied to the reinforcing fiberglass or asbestos generally is either a polyester resin, epoxy resin, phenolic resin, melamine resin, silicone resin, polyvinyl chloride resin, or polystyrene resin.

A number of techniques have been developed for use in connection with reinforced plastics. Where large structures are to be covered with or formed of reinforced plastics, the reinforcing material customarily is laid up against a form whereupon the resin is applied by means of a brush or an ordinary paint roller or spray gun. This technique is used, for example, in covering or forming boat hulls, decks, or the like. In this process, resin is brushed out or rolled out on a fibrous blanket or mat in much the same manner as paint is applied to a surface.

Although the use of brushes or paint rollers to work-up resin-fiber composition has met with some success, such techniques have not solved the problem of entrapped air. Whenever resin is applied to fiberglass blankets, or the like, air bubbles form in the resin. This air must be removed if a satisfactory surface is to be obtained. Experience has shown that paint rollers and brushes are not capable of removing the air in a satisfactory manner. Inasmuch as ordinary paint rollers have but one continuous roller segment, the maneuverability of these devices is limited. Furthermore, the solid surface of the roller does not present any readily available escape routes for the air.

The principal object of the present invention is to provide an improved device for rolling out resin impregnated fibrous surfaces.

Another object of the invention is to provide an economical device for removing entrapped air from reinforced plastic surfaces.

Still another object of the invention is to provide a device for rolling out reinforced plastic surfaces which is maneuverable and which can be applied in a tight 360° circle without distributing the fiber pattern.

Other objects will become apparent to those skilled in the art from the following detailed description of the invention.

In general, the present invention comprises the discovery of an improved device for rolling out reinforced plastic surfaces. The device is made up of a plurality of individual discs which are rotatably mounted on a shaft. The marginal regions of the discs are in spaced relationship to each other. Said discs are loosely mounted on the shaft of the device so that they are free both to rotate around said shaft and to rock back and forth in a lateral direction along the shaft.

The invention can best be understood by reference to the attached drawing in which:

FIGURE 1 is a side elevation view of the device;

FIGURE 2 is an end view of the device showing means for locking the discs on the shaft;

FIGURE 3 is a view taken as indicated in FIG. 1; and

FIGURE 4 is an enlarged sectional view taken along line 4—4 of FIGURE 2.

In FIG. 1, handle 1 terminates in shaft 2 about which discs 3 are free to rotate. The discs are maintained in position by shoulders 4, which are pinched in shaft 2, and by hexagonal nut 5 which screws onto the threaded end of shaft 2. Discs 3 include marginal areas or tires 6, which are formed of a resin resistant substance such as rubber, and hubs 7. As is evident from FIG. 1, the peripheral regions or tires of the discs are in spaced relationship to each other. This spacing allows air to escape readily from the reinforced plastic as the device is rolled across the surface being formed or covered.

In FIG. 2, hexagonal nut 5 is shown engaging the threads of shaft 2. In the embodiment pictured in this figure, the nut is seated in recessed area 8 of end hub 9. Tire or marginal area 6 is attached to hub 9 in the manner shown in FIG. 4. In this embodiment, marginal area 6 includes tapered peripheral region 10.

In FIG. 3, shoulders 4 of shaft 2 are shown holding against washer 11 and hub 7 of disc 3. The marginal area or tire portion of disc 3 includes tapered peripheral region 10.

The internal construction of the roller can best be seen by reference to detailed sectional view 4. In this view, hexagonal nut 5 is shown engaging threads 13 of shaft 2. End hub 9 includes recessed portion 8 which accommodates hexagonal nut 5. Marginal area or tire 6 is anchored in end hub 9 and hubs 7. This sectional view shows hubs 7 as having a forklike construction. Hubs 7 terminate axially in bearings 14 which can consist of insert grommets or the like. The size of the bearings in relationship to the size of the shaft is such that the discs can rock back and forth laterally along the shaft to some extent. The size relationship should be chosen so that the discs can vary from about 2° to about 20° from a vertical plane, preferably from about 3° to 10° from a vertical plane, and more preferably about 5° from a vertical plane. By mounting the discs in this manner it is possible to produce the feeling of a flexible roller without incurring the diadvantages of such a device. Washers 11 surround shaft 2 and lie between adjacent discs. As was pointed out above, marginal areas 6 are in spaced relationship to each other. The space between the tips of tapered regions 10 should be from about 1/16" to 3/8", preferably 1/8" to 1/4", and more preferably 3/16". The space between untapered marginal areas 6 can vary from about 1/32" to 1/4", preferably about 1/24" to 1/8", and more preferably 1/16".

It has been found that a device of the type described is capable of liberating air from reinforced plastic surfaces far more rapidly than ordinary paint rollers or the like. Furthermore, the device has almost unrestricted maneuverability. The use of multiple discs which are individually rotatable about a shaft makes it possible to place a greater load on the tip of each disc. In this manner the glass fibers are forced deeper into the resin or plastic than is possible with conventional rollers while at the same time allowing the entrapped air to rise to the resin surface and escape through the spaces between the discs.

The selection of the material used in forming the marginal portion of the disc is not particularly critical inasmuch as almost any substance can be used which is resistant to the resin. Resilient compositions such as rubber have been found to be particularly well suited for forming the tire of the disc. Resinous material that might harden on the discs can be removed from the discs without difficulty by simply flexing the tire area when this is made of rubber. The hub of the disc ordinarily will be made of a metal such as steel or aluminum. Other metals, of course, as well as certain plastics could be used in place of steel or aluminum.

It is desirable in some instances to taper the peripheral area of the disc. This makes it possible to concentrate the rollout force in small areas. It is not necessary, however, that the tires be tapered. The device can include as many discs as are desired. The width of the roller can be varied, of course, by merely adding or removing discs.

Obviously many modifications and variations of the invention as hereinbefore set forth may be made without departing from the spirit and scope thereof, and therefore only such limitations should be imposed as are indicated in the appended claims.

I claim:

1. A device for rolling out reinforced plastics which comprises in combination: a handle; a shaft connected to said handle; a plurality of discs rotatably mounted and loosely spaced on said shaft, said discs including a hub having a recess in its peripheral region, a marginal area of resin resistant material anchored in said recess of said hub, and a bearing element surrounding said shaft to which said hub is attached, the marginal area of the individual discs being spaced from $1/32''$ to $1/4''$ from each other, said marginal areas including tapered outer regions, the tips of said tapered outer regions being spaced from $1/16''$ to $3/8''$ from each other, the diameter of said bearing elements being slightly larger than the diameter of said shaft to allow said discs to rock in a lateral direction along said shaft in the amount of 2 to 20° from vertical, whereby air is allowed to pass from said reinforced plastic past said discs; washers on said shaft separating said discs from each other; and means for locking said discs on said shaft.

2. A device for rolling out reinforced plastics which comprises in combination: a handle; a shaft connected to said handle; a plurality of discs rotatably mounted and loosely spaced on said shaft, said discs including a hub having a recess in its peripheral region, a marginal area of resin resistant material anchored in said recess of said hub, and a bearing element surrounding said shaft to which said hub is attached, the marginal area of the individual discs being spaced from $1/24''$ to $1/8''$ from each other, said marginal areas including tapered outer regions, the tips of said tapered outer regions being spaced from $1/8''$ to $1/4''$ from each other; the diameter of said bearing elements being slightly larger than the diameter of said shaft to allow said discs to rock in a lateral direction along said shaft in the amount of 3 to 10° from vertical, whereby air is allowed to pass from said reinforced plastic past said discs; washers on said shaft separating said discs from each other; and means for locking said discs on said shaft.

3. A device for rolling out reinforced plastics which comprises in combination: a handle; a shaft connected to said handle; a plurality of discs rotatably mounted and loosely spaced on said shaft, said discs including a hub having a recess in its peripheral region, a marginal area of resin resistant material anchored in said recess of said hub, and a bearing element surrounding said shaft to which said hub is attached, the marginal area of the individual discs being spaced about $1/16''$ from each other, said marginal areas including tapered outer regions, the tips of said tapered outer regions being spaced about $3/16''$ from each other, the diameter of said bearing elements being slightly larger than the diameter of said shaft to allow said discs to rock in a lateral direction along said shaft in the amount of about 5° from vertical, whereby air is allowed to pass from said reinforced plastic past said discs; washers on said shaft separating said discs from each other; and means for locking said discs on said shaft.

4. A device for rolling out reinforced plastics which comprises in combination: a handle; a shaft connected to said handle; a plurality of discs rotatably mounted and loosely spaced on said shaft, said discs including a hub having a recess in its peripheral region, a marginal area of resin resistant material anchored in said recess of said hub, and a bearing element surrounding said shaft to which said hub is attached, the marginal area of the individual discs being in spaced relationship to each other, said marginal areas including tapered outer regions, and the diameter of said bearing elements being slightly larger than the diameter of said shaft to allow said discs to rock in a lateral direction along said shaft, whereby air is allowed to pass from said reinforced plastic past said discs; and means for locking said discs on said shaft.

References Cited in the file of this patent

UNITED STATES PATENTS

| 1,569,426 | Krauthoff | Jan. 12, 1926 |
| 1,999,939 | Luzzi | Apr. 31, 1935 |

FOREIGN PATENTS

| 429,120 | Great Britain | May 24, 1935 |